(12) United States Patent
Kim

(10) Patent No.: US 8,150,323 B2
(45) Date of Patent: Apr. 3, 2012

(54) MOBILE COMMUNICATION TERMINAL AND METHOD FOR INPUTTING/OUTPUTTING VOICE DURING PLAYBACK OF MUSIC DATA BY USING BLUETOOTH

(75) Inventor: Hyun-Soo Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 771 days.

(21) Appl. No.: 11/834,387

(22) Filed: Aug. 6, 2007

(65) Prior Publication Data
US 2008/0039017 A1 Feb. 14, 2008

(30) Foreign Application Priority Data
Aug. 8, 2006 (KR) .................. 10-2006-0074826

(51) Int. Cl.
*H04B 7/00* (2006.01)
*H04M 1/00* (2006.01)
*H04M 9/00* (2006.01)
*G09F 27/00* (2006.01)

(52) U.S. Cl. .............. 455/41.3; 455/569.1; 455/41.2; 379/420.02; 379/420.04; 381/124

(58) Field of Classification Search ............. 455/41.2, 455/41.3, 556.1, 569.1, 569.2, 344; 379/420.01, 379/420.02, 420.04; 381/124
See application file for complete search history.

(56) References Cited

U.S. PATENT DOCUMENTS

| 7,376,778 B2 * | 5/2008 | Sinai ............................ 710/312 |
| 7,489,951 B2 * | 2/2009 | Kanamori et al. ............ 455/567 |
| 7,697,947 B2 * | 4/2010 | Wakefield ..................... 455/502 |
| 2004/0125965 A1 | 7/2004 | Alberth, Jr. et al. |
| 2005/0106546 A1 * | 5/2005 | Strom ....................... 434/307 A |
| 2005/0135297 A1 | 6/2005 | Katayama |
| 2005/0255817 A1 | 11/2005 | Edeler |
| 2006/0079180 A1 * | 4/2006 | Sinivaara .................... 455/41.2 |
| 2006/0274747 A1 * | 12/2006 | Duchscher et al. ........... 370/389 |
| 2007/0259621 A1 * | 11/2007 | Lin et al. .................... 455/41.2 |
| 2008/0014938 A1 * | 1/2008 | Hart et al. ................. 455/435.1 |

FOREIGN PATENT DOCUMENTS

| JP | 2005-184321 | 7/2005 |
| KR | 1020030071040 | 9/2003 |
| KR | 1020050015165 | 2/2005 |
| KR | 1020060025309 | 3/2006 |
| WO | WO 01/15410 | 3/2001 |

* cited by examiner

*Primary Examiner* — Andrew Wendell
(74) *Attorney, Agent, or Firm* — The Farrell Law Firm, P.C.

(57) ABSTRACT

A mobile communication terminal and a voice input/output method for inputting/outputting voice during playback of music data by using a Bluetooth communication scheme are disclosed. The method includes connecting to a headset via a simplex channel according to the Bluetooth communication scheme when music data is played; determining if a call has been connected; terminating current connection to the headset via the simplex channel and connecting to the headset via a duplex channel according to the Bluetooth communication scheme while maintaining the playback of music data when the call has been connected; mixing decoded music data with data obtained by decoding incoming voice data received from the communication partner as a result of a call connection; and outputting the mixed data to the headset via a transmission channel of the duplex channel and receiving originating voice data of the user from the headset via a reception channel of the duplex channel.

18 Claims, 5 Drawing Sheets

MOBILE COMMUNICATION TERMINAL AND METHOD FOR INPUTTING/OUTPUTTING VOICE DURING PLAYBACK OF MUSIC DATA BY USING BLUETOOTH

PRIORITY

This application claims priority under 35 U.S.C. §119(a) to a Korean Patent Application entitled "Mobile Communication Terminal and Method for Inputting/Outputting Voice during Playback of Music Data by Using Bluetooth" filed in the Korean Industrial Property Office on Aug. 8, 2006 and assigned Serial No. 2006-74826, the contents of which are incorporated herein by reference.

BACKGROUND OF THE INVENTION

1. Field of the Invention

The present invention relates to a mobile communication terminal capable of data transmission using Bluetooth® technology, (hereinafter "Bluetooth") and in particular, to a method for inputting/outputting voice data during the playback of music data using Bluetooth technology.

2. Description of the Related Art

Generally, short-distance wireless communication technology, such as Bluetooth technology, aims at enabling wireless communication within a short range with little cost. Advantageously, since data can be transmitted/received between terminals or to/from a wireless headset without using cables, the short-distance wireless communication has an increasing field of application. For example, it can be used between a computer and a peripheral device, such as a monitor, a printer, a keyboard, or a wireless headset for wireless connection. The short-distance wireless communication is also applicable to various types of electronic terminals (e.g. PDAs, desktops, FAXs), as well as between a digital multimedia broadcast receiving terminal and a wireless headset.

The Bluetooth generally refers to a protocol for specifying a wireless connection to a variety of terminals and Bluetooth devices at a rate of 1 Mbps by using a frequency in the ISM (Industrial, Scientific, Medical) band of 2.45 GHz. When other Bluetooth devices exist nearby, a mobile communication terminal, i.e. a host device, inspects each Bluetooth device based on a HCI (Host Controller Interface) inquiry. Then, the mobile communication terminal receives information regarding services that an inspected Bluetooth device can provide (e.g. information regarding the profile of the Bluetooth device) based on a HCI response signal from the Bluetooth device.

The profile refers to a driver for driving a Bluetooth device. In particular, the profile corresponds to a set of predetermined commands for driving a Bluetooth device according to a service provided by the Bluetooth device. When the host device inspects a Bluetooth printer and drives it, the host device receives a printer profile from the Bluetooth printer and displays the received profile to the user. If the user instructs via the host device that the Bluetooth printer perform a printing operation, the host device loads the printer profile, which has been received from the Bluetooth printer, and connects to the Bluetooth printer based on the printer profile for the printing operation.

Such profiles typically include a telephone profile, an AG (Audio Gate) profile, an AV (Audio/Video Source) profile, etc. The telephone profile is used to drive a Bluetooth device for providing telephone and wireless communication functions when these functions are to be implemented. The AG profile is used to generate a duplex audio channel between a host device (e.g. mobile communication terminal) and a Bluetooth device so that data is exchanged between them. The AV profile is used to generate a simplex channel, which has a bandwidth greater than that generated by the AG profile, between a host device and a Bluetooth device so as to transmit simplex audio data from the host device to the Bluetooth device.

As described above, the AG profile generates a duplex channel between a Bluetooth device and a host device for real-time duplex data exchange. Thus, if the mobile communication terminal is a portable telephone incorporating a telephone function, and if the Bluetooth device is a headset equipped with both a microphone and a speaker, the AG profile enables the user to make a call by means of the headset.

Unlike the AG profile, the AV profile generates a simplex channel from a host device to a Bluetooth device. Therefore, the bandwidth of a channel generated by the AV profile is twice as large as that of a channel provided by the AG profile. In this case, the channel generated based on the AV profile can transmit data greater than that transmitted via the AG profile channel. Thus, the AV profile is suitable for transmission of high-quality audio data, such as music data.

In the case of a Bluetooth device (e.g. headset), which incorporates both a music data output function and a telephone call function, the device provides the host device with information regarding both the AG and AV profiles as a response to an HCI inquiry of the host device because both profiles are supported. The host device then selects a suitable one from the profiles according to the current operation condition and drives the Bluetooth device. For example, when voice is inputted/outputted during a telephone call, the AG profile is loaded so as to drive the Bluetooth device (headset). When music data (MP3) is played based on the Bluetooth scheme, the AV profile is loaded so as to drive the Bluetooth device (headset).

However, the AG and AV profiles cannot be used interchangeably because they generate different channels with the Bluetooth device, and different data are transmitted via the channels. For instance, when a Bluetooth device is driven based on the AG profile, a duplex channel can be generated. However, it is impossible to transmit music data to the Bluetooth device via one of the currently generated duplex channel. When the Bluetooth device is driven based on the AV profile, a simple channel is generated through which the user's originating sound cannot be output, thereby making communication impossible.

Therefore, when a Bluetooth device is driven based on the AV profile at the user's request for playback of music data (MP3), the arrival of an incoming call or the user's request for an originating call requires that the connection to the Bluetooth device based on the AV profile be terminated and followed by reconnection to the Bluetooth device based on the AG profile. As such, under the conventional approach, the playback of music data is inevitably interrupted in the case of an incoming or originating call, which results in a user's music listening time being interrupted during a call.

SUMMARY OF THE INVENTION

Accordingly, the present invention has been made to solve at least the above-mentioned problems occurring in the prior art, and the present invention provides a mobile communication terminal and a voice input/output method, wherein, even when a telephone call is made during playback of music data based on a Bluetooth communication scheme, voice data resulting from the telephone call is input/output without interruption of the playback of music data.

The present invention also provides a mobile communication terminal and a voice input/output method for enabling a user to enjoy music even during communication resulting from an incoming or originating call using a Bluetooth communication scheme.

According to one aspect of the present invention, there is provided a mobile communication terminal connected to a Bluetooth headset according to a Bluetooth communication scheme so as to input/output voice data during the playback of music data. The mobile communication terminal includes a music data decoding module for decoding and outputting selected music data; a modem for receiving, decoding, and outputting incoming voice data received from a communication partner when a call is connected, the modem receiving, modulating, and outputting originating voice data of a user; a mixer for mixing the music data with the incoming voice data so as to output mixed data; a Bluetooth module connected to the headset via a simplex channel or a duplex channel according to a Bluetooth communication scheme, the Bluetooth module receiving the originating voice data of the user from the headset via a reception channel of the duplex channel and outputting the mixed data via a transmission channel of the duplex channel when a connection is established via the duplex channel; and a controller for controlling the Bluetooth module so as to connect to the headset via a simplex channel when music data is output, the controller controlling the Bluetooth module so as to establish a duplex channel with the headset when a call is connected while streaming music data, the controller outputting the mixed data to the headset via the transmission channel when the call is connected.

According to another aspect of the present invention, there is provided a method for inputting/outputting voice data during the playback of music data in a mobile communication terminal connected to a Bluetooth headset according to a Bluetooth communication scheme. The method includes connecting to the headset via a simplex channel according to the Bluetooth communication scheme and transmitting music data when the music data is played according to selection of a user; determining if a call has been connected; terminating the current connection to the headset via the simplex channel and connecting to the headset via a duplex channel according to the Bluetooth communication scheme while maintaining the unchanged playback of the music data when the call has been connected; decoding the music data and mixing the music data with data obtained by decoding incoming voice data received from a communication partner as a result of a call connection so as to obtain mixed data; and outputting the mixed data to the headset via a transmission channel of the duplex channel and receiving originating voice data of the user from the headset via a reception channel of the duplex channel.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Figure 1:
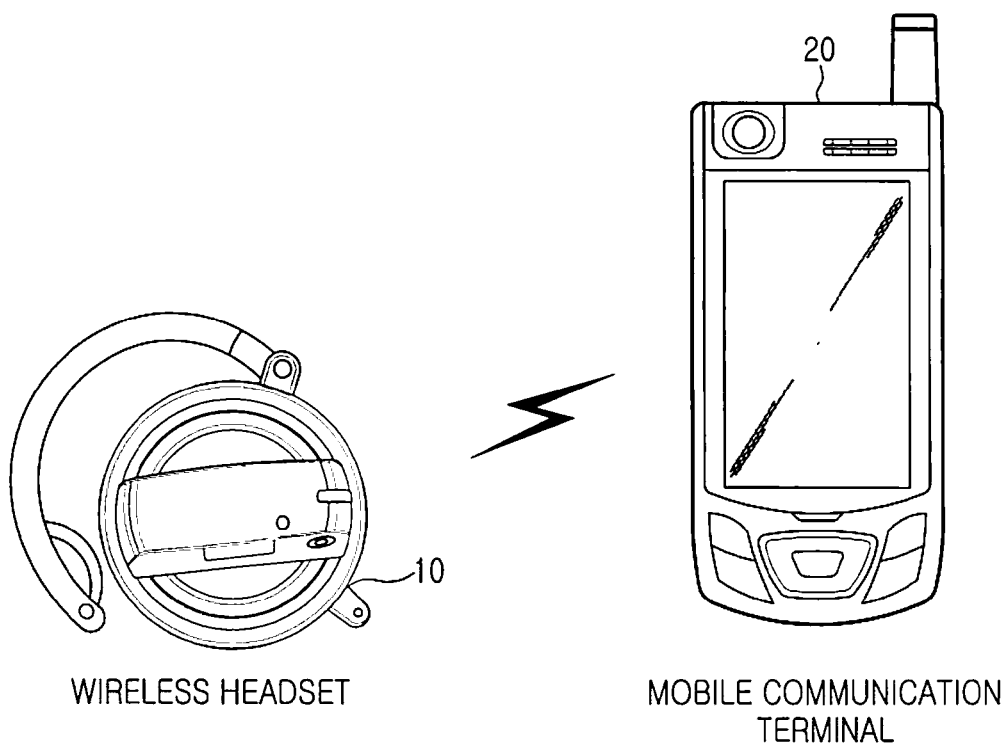
FIG. 1 is a diagram illustrating a mobile communication terminal and a wireless headset according to an embodiment of the present invention.

An exemplary embodiment of the present invention will be described with reference to the accompanying drawings. In the following description, the same elements will be designated by the same reference numerals although they are shown in different drawings. Further, various specific definitions found in the following description, such as specific values of packet identifications, contents of displayed information, etc., are provided only to help general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

FIG. 1 shows a mobile communication terminal 20 and a wireless headset 10. The mobile communication terminal 20 connects to the wireless headset 10 according to a Bluetooth communication scheme in the following manner. In a standby condition, i.e. when there is no connection between the mobile communication terminal 20 and the wireless headset 10, the mobile communication terminal 20 and the wireless headset 10 receive a new message every 1.28 seconds. When one device, i.e. the mobile communication terminal 20, makes a connection request, the mobile communication terminal 20 becomes a master and begins to recognize the other device, i.e. the wireless headset (inquiry/page). When an 8-bit park address is assigned to a device, the device goes into a park mode. If 3-bit active address is assigned to the wireless headset 10, which communicates with the mobile communication terminal 20 (master), a piconet is established (since $2^3=8$, one of 8 addresses is used as a broadcasting address, and two devices constitute one piconet). Here, a device operates in one of three modes: (1) an active mode during actual communication, (2) a hold mode, and (3) a sniff mode in which the device consumes less power than in the active mode. When a device is in a hold or sniff mode, the device participates in the piconet, but does not affect the overall traffic. When located within a predetermined distance, the mobile communication terminal 20 (master) transmits a connection request signal, which includes a key for connection, at an interval of 625 μs. Upon receiving a connection acknowledgment signal from the wireless headset 10 (slave), the mobile communication terminal 20 synchronizes with the wireless headset 10 within 2 seconds so that a 3-bit active address is assigned thereto. After receiving a page message from the mobile communication terminal 20, the wireless headset 10 is synchronized by using a hopping pattern, which has been determined by the mobile communication terminal 20. A mutual authentication is performed by using an encryption key, which corresponds to exclusive logical sum (XOR)

of a random number generated by the mobile communication terminal 20 and a MAC address of the wireless headset 10. Completion of the authentication procedure is followed by transmission of a private key, establishment of a communication link, and data transmission/reception. Although the wireless headset 10 is a slave in this case, the wireless headset 10 may act as a master in another piconet.

Figure 2:
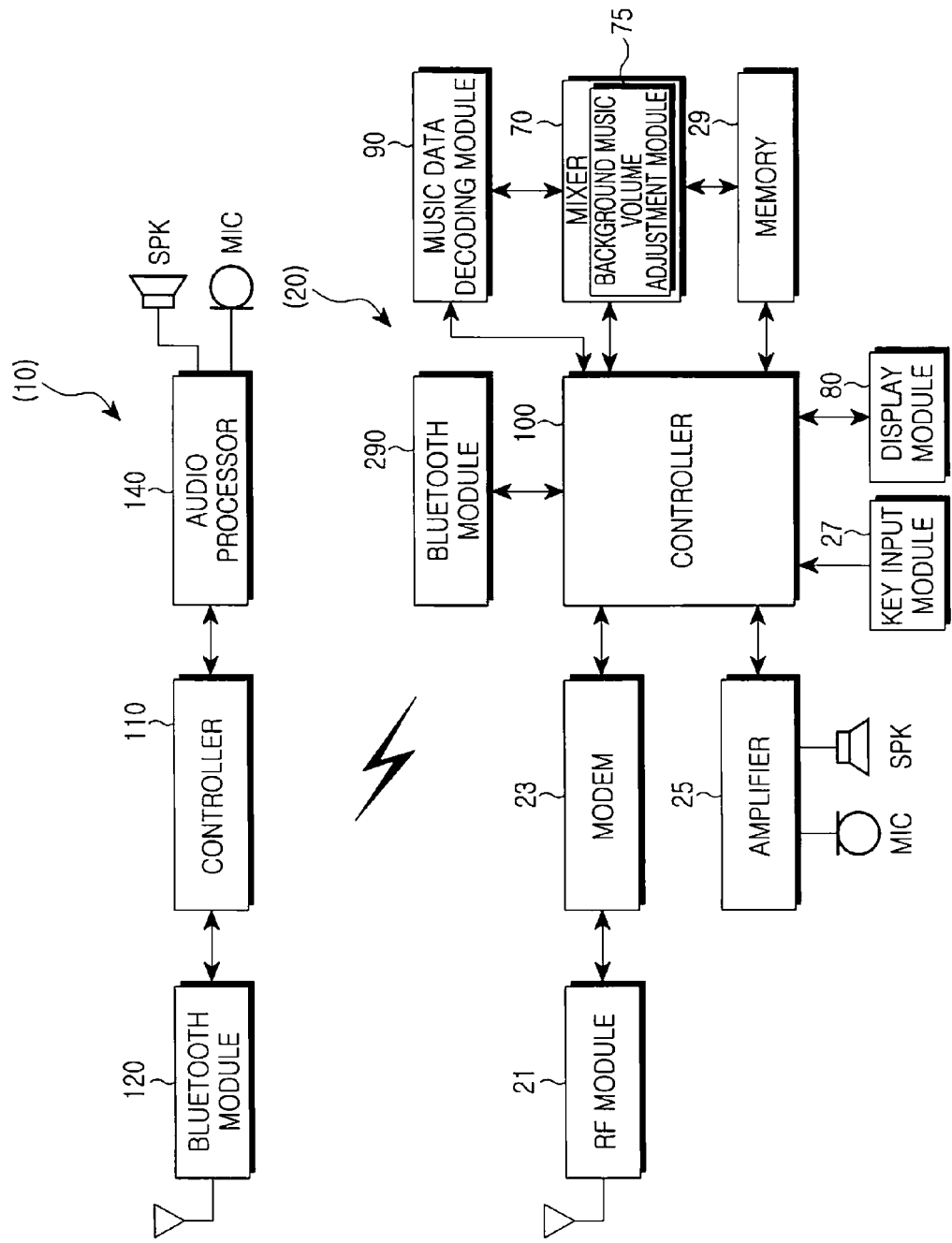
FIG. 2 is a block diagram illustrating the construction of a mobile communication terminal and a wireless headset according to an embodiment of the present invention.

FIG. 2 is a block diagram showing the construction of a mobile communication terminal and a wireless headset according to an embodiment of the present invention.

In FIG. 2, the wireless headset 10 includes a controller 110, a Bluetooth module 120, and an audio processor 140. The controller 110 controls the overall operation of respective components according to an AV profile for audio data playback by the wireless headset 10 and an AG profile for reception and output of communication data during user-to-partner communication, as well as for input, reception, and output of the user's voice.

The Bluetooth module 120 performs Bluetooth communication under the control of the controller 110. Particularly, the Bluetooth module 120 transmits/receives data to/from a Bluetooth module 290 of the mobile communication terminal 20 according to a Bluetooth communication scheme.

Under the control of the controller 110, the audio processor 140 receives music data or incoming voice data via the Bluetooth module 290, processes the data, and outputs it to a speaker SPK. The audio processor 140 converts voice signals, which are input via a microphone MIC, into digital signals and transmits them to the mobile communication terminal 20 via the Bluetooth module 120.

The mobile communication terminal 20 includes an RF (Radio Frequency) module 21, a modem 23, an amplifier 25, a key input module 29, a display module 80, a controller 100, a memory 29, a mixer 70, a music data decoding module 90, and a Bluetooth module 290. The controller 100 processes voice signals and data and controls respective components of the mobile communication terminal according to a protocol for telephone calls, data communication, or wireless Internet access. The controller 100 establishes a simplex or duplex channel to connect to the headset 10 according to the Bluetooth communication scheme. The controller 100 receives the user's key input from the key input module 29 and controls the display module 80 so that image information is generated and displayed in response to the user's key input. The controller 100 controls the music data decoding module 90 as the user intends so as to decode music data and output the decoded music data to the wireless headset 10 via a channel, which has been established based on an AV profile currently set for the Bluetooth module 290. The controller 100 also monitors a signal requesting an incoming or originating call.

In operation, when the user receives an incoming call or makes an originating call, the controller 100 terminates the current channel connection to the headset 10 as soon as the call is connected. Then, the controller 100 loads the AG profile and connects to the headset 10 via a channel based on the AG profile. The controller 100 controls the music data decoding module 90 so as to decode the music data into data at a PCM (Pulse Code Modulation) level. The controller 100 inputs the decoded music data to the mixer 70 together with the data obtained by decoding the incoming voice data (i.e. data related to incoming voice of the communication partner) at the PCM level by the modem 23, so that the mixer 70 mixes both pieces of data. By adjusting the amplification gain of music data decoded by the music data decoding module 90 according to the user's key input, the controller 10 can adjust the volume level of the music data.

The controller 100 outputs the mixed PCM-level data to the headset 10 via a Bluetooth transmission channel of a duplex channel generated based on the AG profile. The controller 100 receives the user's voice data, which has been encoded into PCM-level data, from the headset 10 via a Bluetooth reception channel generated based on the AG profile, and outputs the data to the communication partner via the RF module 21.

According to the user setup, the controller 100 may mix the user's voice data with the music data, which has been decoded into PCM-level data, and output the mixed data to the communication partner. In this case, the controller 100 inputs the user's voice data to the mixer 70, which mixes the input voice data with the music data, which has been decoded into PCM-level data by the mixer 70, and outputs the resulting data to the modem 23. The modem 23 then modulates the received data and outputs it to the RF module 21, which transmits the mixed data to the current communication partner as RF signals. Thus, the present invention has an advantage in that, even when a call is connected while the user is enjoying music, the playback of music data is not necessarily interrupted. In addition, the user can enjoy music as a background sound during communication and/or the partner.

The RF module 21 converts received signals into IF (Intermediate Frequency) signal and outputs them to the modem 23, which is connected to the controller 100. The RF module 21 converts IF signals, which are inputted from the modem 23, into RF signals and transmits them so that communication is performed between the mobile communication terminal 20 and a base station by using RF signals. The RF module 21 includes a RF transmitter for the amplification of transmitted signals and up-conversion of their frequency, as well as a RF receiver for low-noise amplification of received signals and down-conversion of their frequency.

The modem 23, i.e. a baseband processor, includes a transmitter for encoding and modulating the transmitted signals and a receiver for demodulating and decoding the received signals. The modem 23 plays the role of a BBA (Baseband Analog ASIC) for providing an interface between the controller 100 and the RF module 21. Particularly, the modem 23 converts baseband digital signals from the controller 100 into analog IF signals and applies them to the RF module 21. In addition, the modem 23 converts analog IF signals received from the RF module 21 into baseband digital signals and applies them to the controller 100.

The amplifier 25, which is connected to the controller 100, is connected to the microphone and the speaker. The amplifier 25 subjects voice signals, which are input from the microphone, to PCM encoding and outputs the resulting voice data to the controller 100. The amplifier 25 subjects voice data, which is inputted from the controller, to PCM decoding and outputs the resulting data to the speaker. In addition, the amplifier 25 amplifies voice signals input from the microphone or voice signals output to the speaker, and adjusts the volume of the speaker and the gain of the microphone under the control of the controller 100.

The key input module 27 is equipped with a number of keys for inputting numeric and character information, as well as and a number of function keys for setting up various functions.

The memory 29 may consist of both a program memory and a data memory. The program memory stores programs for controlling the general operation of a portable telephone, and the data memory temporarily stores data generated while the programs are executed. According to one embodiment of the present invention, the memory 29 stores music data (e.g. MP3), general programs for Bluetooth communication, and various profiles received from Bluetooth devices.

The Bluetooth module 290, which is adapted for Bluetooth communication, transmits/receives data to/from the Bluetooth module 120 of the wireless headset 10 by performing Bluetooth communication with the wireless headset 10 under the control of the controller 100. As such, the Bluetooth module 290 modifies the data, which is to be transmitted and received, into a data format suitable for Bluetooth communication, or restores the data.

Under the control of the controller 100, the mixer 70 mixes the music data (e.g. MP3), which has been decoded into PCM-level data, with originating voice data, which is obtained by encoding voice data into PCM-level data. The voice data is generated during a telephone call, and may be incoming voice data decoded into PCM-level data by the modem 23 or the user's voice data input from the microphone of the headset 10. The mixer 70 has a background music volume adjustment module 75 and adjusts the amplification gain of the music data according to user's key input under the control of the controller 100, so that the volume of mixed music data is adjusted.

The display module 80 displays image data to be output. An LCD may be used as the display module 80, which then includes an LCD controller, a memory capable of storing image data, and an LCD display device. When a touch screen-type LCD is used, the keypad 27 and the LCD may constitute an input module as a whole. The display module 80 has an image display module for outputting image data.

Figure 3:
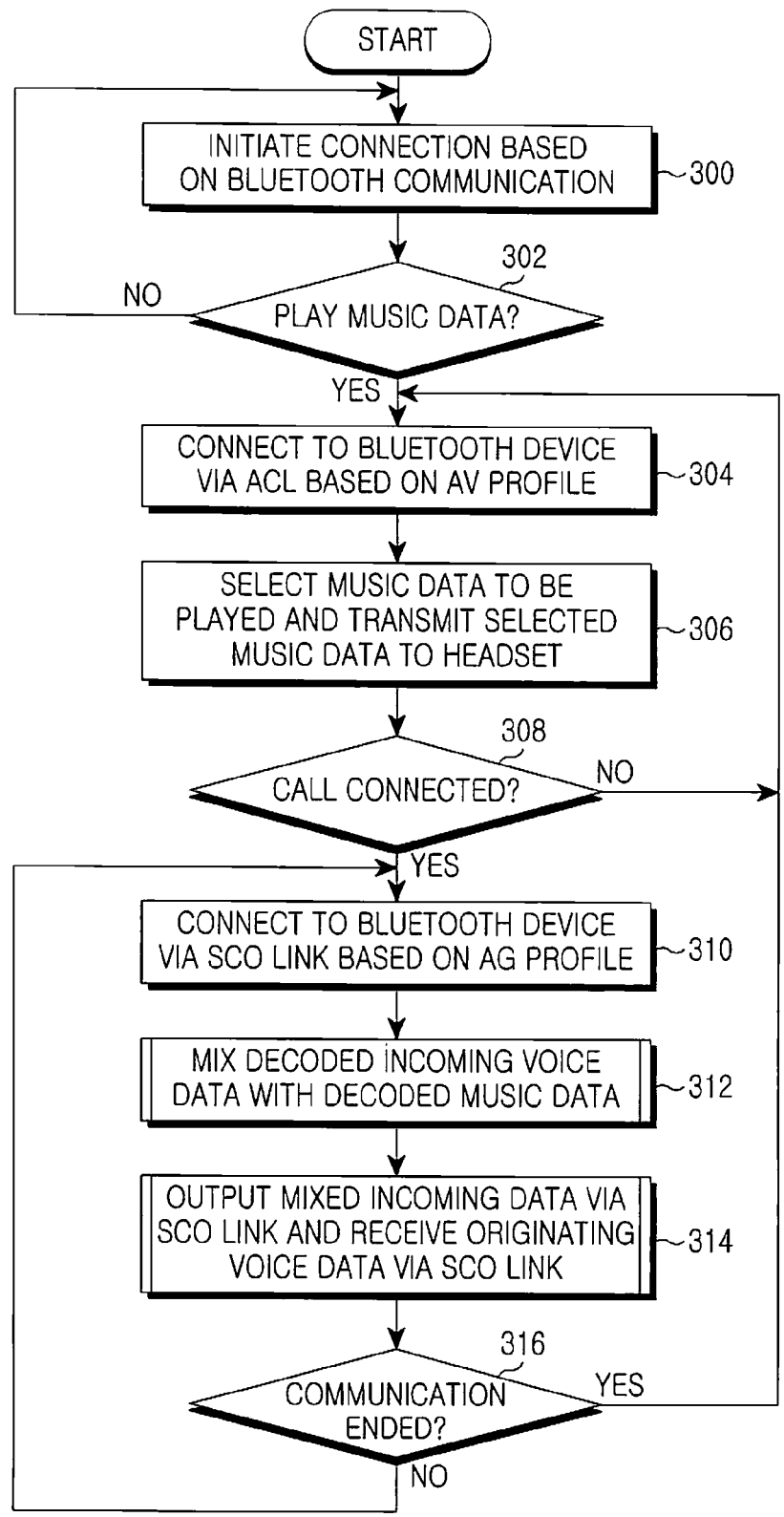
FIG. 3 is a flowchart illustrating a process for connecting a call during playback of music data based on Bluetooth communication scheme used by a mobile communication terminal according to an embodiment of the present invention.

FIG. 3 is a flowchart illustrating a process for connecting a call during playback of music data based on Bluetooth communication by a mobile communication terminal according to an embodiment of the present invention.

In FIG. 3, the controller 100 of the mobile communication terminal 20 initiates Bluetooth communication connection to the headset 10 and maintains the Bluetooth communication connection in step 300. In step 302, the controller 100 checks if the user has selected the playback of music data.

When it is determined in step 302 that the user has selected playback of music data, the controller 100 selects an AV profile from Bluetooth profiles received from the headset 10. The controller 100 generates an ACL (Asynchronous Connectionless) link with the headset 10 according to the selected AV profile and transmits decoded music data to the headset 10, i.e. a Bluetooth device, via the generated ACL link.

The ACL link refers to a channel defined for data communication according to the Bluetooth communication scheme. The ACL link channel is also commonly used to support music transmission. In general, music CD-grade audio data requires a data transmission rate of 1411.2 kbps, which can be reduced to about 128 kbps by using data compression technology (e.g. MP3). Therefore, when music data is transmitted via the ACL link channel, the sound quality is comparable to that of live music, i.e. CD-grade audio data is transmitted as long as the time delay condition regarding transmission is maintained.

When connected to the headset 10 via the ACL link channel in step 304, the controller 100 decodes music data according to the user's selection and transmits the decoded music data to the headset 10 via the ACL link channel in step 306.

In step 308, the controller 100 checks if a call connection has been made as a result of an incoming or originating call. When it is determined in step 308 that a call connection has been made as a result of an incoming or originating call, the controller 100 proceeds to step 310 without interrupting the operation of the music data decoding module 90. The controller 100 then terminates the Bluetooth connection based on the current AV profile, i.e. the connection to the headset 10 via the ACL link. In step 310, the controller 100 generates an SCO (Synchronous Connection-Oriented) channel with the headset 10 (Bluetooth device) according to the AG profile and connects to the headset 10 via the generated SCO channel. The SCO channel refers to a channel for voice communication, and operates at 64 kbps. The SCO channel may have a voice link when a duplex channel is established. However, unlike the ACL link channel, the bandwidth of the SCO channel is not broad enough to enable the user to enjoy music, i.e. the SCO channel is not suitable for transmission of high-quality audio data.

In that case, according to one embodiment of the present invention, the controller 100 proceeds to step 312 and controls the mixer 70 so as to mix the music data, which has been decoded into PCM-level data by the music data decoding module 90, with the incoming voice data, which has been decoded into PCM-level data by the modem 23. When the user uses the key input to adjust the amplification gain of the decoded music data, the controller 100 adjusts the amplification gain of the decoded music data according to the key input and mixes the music data with the incoming voice data. As such, the mobile communication terminal 20 according to the embodiment of the present invention enables the user to adjust the volume of music data by adjusting the amplification gain.

In step 314, the controller 100 outputs the incoming voice data, which has been mixed with the music data in step 312 (mixed incoming data) to the headset 10 via a transmission channel of the duplex channel, which has been generated via the currently-set SCO link. In addition, the controller 100 receives the user's voice, which is inputted from the headset 10, via a reception channel of the duplex channel generated via the SCO link.

As described above, the SCO channel is a duplex channel, which guarantees that the above-mentioned process occurs in real time. In this case, the user's voice is quantized and converted into PCM-level data by the headset 10. After the conversion, the user's voice data is received by the mobile communication terminal 20 via the Bluetooth module 290. The received voice data may be mixed with the music data, which has been decoded into PCM-level data by the mixer 70, and output to the modem 23. In this case, not only the user, but also the communication partner receive the music data as background music during user-to-partner communication.

In step 316, the controller 100 checks if the user has terminated the call. When it is determined in step 316 that the user has terminated the call, the controller 100 terminates the connection based on the current AG profile and returns to step 304, in which it connects to the headset 100 based on the AV profile. Thereafter, steps 304 to 308 are repeated. However, when it is determined in step 316 that the user has not terminated the call, the controller 100 proceeds to step 310 and maintains the connection via the SCO link channel based on the current AG profile. Steps 312 to 316 are then repeated. Thus, the present invention is advantageous in that, even when a call is connected while the user is enjoying music, the playback of music data is not necessarily interrupted. In addition, the user can continuously enjoy music as a background sound during user-to-partner communication.

Figure 4:
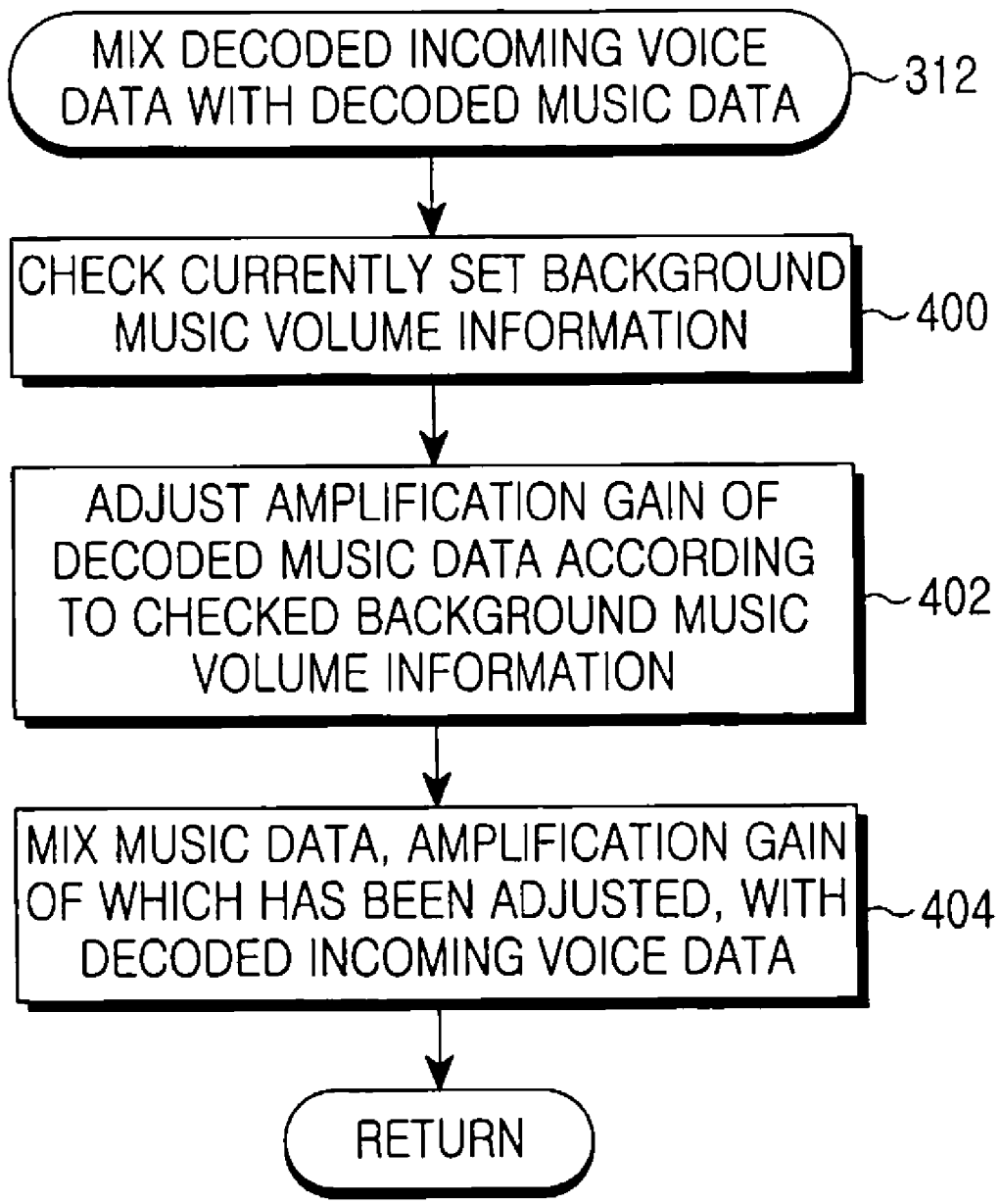
FIG. 4 is a flowchart illustrating a process for adjusting the volume of mixed music data by a mobile communication terminal according to an embodiment of the present invention.

FIG. 4 is a flowchart illustrating a process for adjusting the volume of mixed music data by a mobile communication terminal according to an embodiment of the present invention.

In FIG. 4, the controller 100 terminates the connection to the headset 10 via the current ACL link and connects to the headset 10 via an SCO channel based on the AG profile. Then, the controller 100 proceeds to step 400 and checks currently set background music volume information.

In step 402, the controller 100 adjusts the amplification gain of decoded music data according to the checked background music volume information. If the user has set the background music volume low, the amplification gain will be set low. This reduces the size of music data, which is mixed with the decoded incoming data, and decreases the volume of the music data, i.e. the background music. If the user has set the background music volume high, the amplification gain will be set high. This increases the volume of the background music in a similar manner. The music data, the amplification gain of which has been adjusted, may be mixed with the user's originating voice data.

In step 404, the controller 100 mixes the music data, the amplification gain of which has been adjusted, with the currently decoded incoming data. The controller 100 outputs the mixed data to the headset 10 in step 314. In this case, the sound quality may degrade slightly, but the playback of the music data is not necessarily interrupted for communication. In addition, the user can continuously enjoy music as background music during user-to-partner communication.

Figure 5:
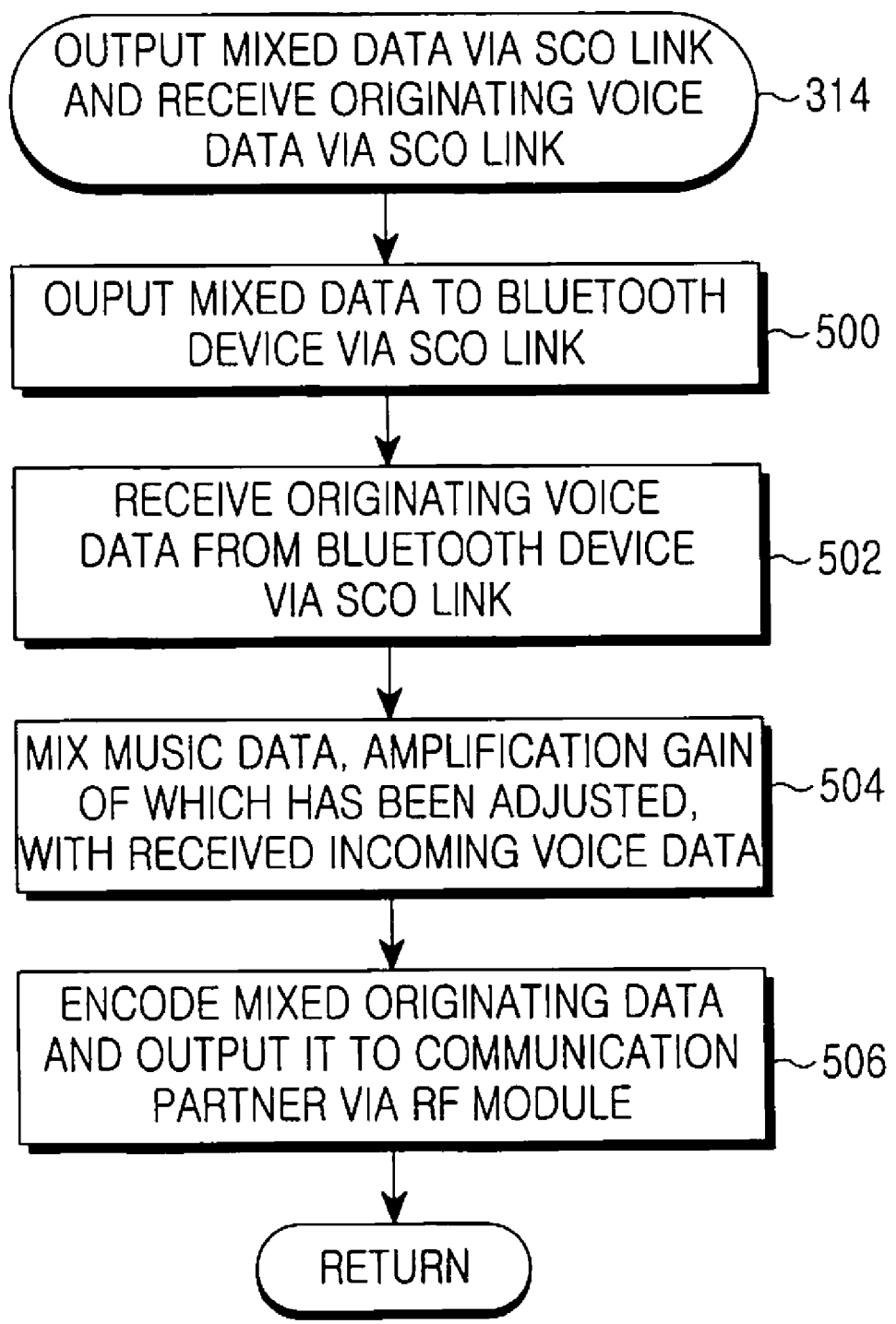
FIG. 5 is a flowchart illustrating a process for outputting mixed incoming data to a Bluetooth device and output originating voice data by a mobile communication terminal according to the embodiment of the present invention.

FIG. 5 is a flowchart illustrating steps for the output of mixed incoming data to a Bluetooth device and output originating voice data by a mobile communication terminal according to the embodiment of the present invention.

In FIG. 5, when the controller 100 of the mobile communication terminal 20 has controlled the mixer 70 so as to mix the music data, which has been decoded into PCM-level data by the music data decoding module 90, with the incoming voice data, which has been decoded into PCM-level data by the modem 23, in step 312, the controller 100 proceeds to step 500. The controller 100 then outputs the mixed data to the Bluetooth device, i.e. headset 10, via the SCO link channel, i.e. transmission channel of a duplex channel. In step 502, the controller 100 receives the user's originating voice data, which has been encoded into the PCM-level data, from the headset 10 via a reception channel of the SCO link channel. In step 504, the controller 100 mixes music data, the amplification gain of which has been adjusted according to the background music volume adjusted by the user, with the originating voice data received in the previous step (mixed originating data). In step 506, the controller 100 controls the modem 23 so as to modulate the mixed originating data, which has been obtained in step 504, and controls the RF unit 21 so as to output RF signals to the communication partner. In this case, not only the user, but also the communication partner can hear background music during user-to-partner communication.

When the communication partner carries a mobile communication terminal 20 incorporating the same function as according to the embodiment of the present invention, the music data from both sides may be mixed. Particularly, data output to the user may intermingle with music data received from the communication partner and the music data output from the music data decoding unit 90 of the user. In this case, the controller 100 preferably mixes originating data with music data from either the user or the communication partner according to whether or not the music data decoding module 90 is currently driven. For example, the background music is loaded onto communication data from the originating side alone. Alternatively, the background music is mixed with communication data from the receiving side alone.

As such, the present invention is advantageous in that, even when a telephone call is made during the playback of music data based on a Bluetooth communication scheme, voice data resulting from the telephone call is input/output without interruption during the playback of music data. In addition, the user can enjoy music even during communication resulting from an incoming or originating call by using the Bluetooth communication scheme.

Although it has been assumed in the above description of embodiments of the present invention that a call is connected during playback of music data, the present invention is not limited to that assumption. Namely, the mobile communication terminal according to the present invention is applicable not only to a case in which a call is connected during the playback of the music data, but also to a case in which the playback of music data is selected while a call is connected.

In this case, the mobile communication 20 terminal according to one embodiment of the present invention maintains a connection to the headset 10 based on the AG profile and drives the music data decoding module 90 so as to decode the music data selected by the user into PCM-level data, which is mixed with incoming voice data by the mixer 70 and output to the headset 10.

Alternatively, the decoded music data is mixed with the originating voice data by the mixer 70 and is outputted to the modem 23. As such, the application of the present invention is not limited to a case in which a call is connected during the playback of the music data.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A mobile communication terminal connected to a Bluetooth headset according to a Bluetooth communication scheme which allows the input/output of voice data during playback of music data, the mobile communication terminal comprising:
   a music data decoding module for decoding and outputting music data;
   a modem for decoding and outputting incoming voice data received from a communication partner when a call is connected, the modem modulating and outputting originating voice data of a user received from the headset;
   a mixer for mixing the music data with the incoming voice data and outputting mixed data;
   a Bluetooth module connected to the headset through one of a simplexer and a duplexer; and
   a controller for controlling the Bluetooth module so as to connect to the headset through the simplexer when music data is output, the controller controlling the Bluetooth module to terminate the connection to the headset through the simplexer and connect to the headset through the duplexer when a call is connected while streaming music data, the controller outputting the mixed data to the headset without interruption of music data streaming through a transmission channel of the duplexer when the call is connected, the controller controlling the mixer to mix the music data and the originating voice data received through a reception channel of the duplexer so that the communication partner receives the music data as background music during user-to-partner communication, the controller controlling the modem to modulate mixture data resulting from mixing of the originating voice data and the music data, to output the mixture data to the communication partner.

2. The mobile communication terminal as claimed in claim 1, wherein the controller adjusts the amplification gain of the music data according to the key input of the user, controls the mixer for mixing the music data with the incoming voice data and controls the Bluetooth module for outputting the mixed data through the transmission channel of the duplexer.

3. The mobile communication terminal as claimed in claim 1, wherein the controller controls the Bluetooth module for receiving the originating voice data through a reception channel of the duplexer, controls the mixer for mixing the originating voice data with the music data, and controls the modem to modulate mixture data resulting from the mixing of the originating voice data and the music data so that the mixture data is transmitted to the communication partner.

4. The mobile communication terminal as claimed in claim 3, wherein the controller controls the amplification gain of the music data according to the key input of the user, controls the mixer for mixing the music data with the originating voice data.

5. The mobile communication terminal as claimed in claim 1, wherein, when the playback of music data is selected while a call is connected, the controller decodes selected music data, mixes the music data with the incoming voice data, and outputs resulting mixed data to the headset while maintaining an unchanged connection between the duplexer and the headset.

6. The mobile communication terminal as claimed in claim 1, wherein the music data decoding module decodes the music data into Pulse Code Modulation (PCM) level data and the mixer mixes the music data with the incoming voice data or the originating voice data at the PCM level, both the music data and the incoming voice data having been decoded into PCM level data.

7. The mobile communication terminal as claimed in claim 3, wherein the music data decoding module decodes the music data into Pulse Code Modulation (PCM) level data and the mixer mixes the music data with the incoming voice data or the originating voice data at the PCM level, both the music data and the incoming voice data having been decoded into PCM level data.

8. The mobile communication terminal as claimed in claim 1, wherein the music data decoding module decodes the music data into Pulse Code Modulation (PCM) level data and the mixer mixes the music data with the incoming voice data or the originating voice data at the PCM level, both the music data and the incoming voice data having been decoded into PCM level data.

9. The mobile communication terminal as claimed in claim 1, wherein the simplexer is an Asynchronous Connectionless Link (ACL) channel based on an audio video profile selected from Bluetooth profiles according to the Bluetooth communication scheme, and the duplexer is a Synchronous Connection-Oriented (SCO) link channel based on an audio gate profile selected from Bluetooth profiles according to the Bluetooth communication scheme.

10. The mobile communication terminal as claimed in claim 1, wherein the simplexer is used to transmit data from the mobile communication terminal to the headset and the duplexer is used to exchange data between the mobile communication terminal and the headset.

11. The mobile communication terminal as claimed in claim 1, wherein a bandwidth of the simplexer is greater than a bandwidth of the duplexer.

12. A method for inputting/outputting voice during the playback of music data by using Bluetooth in a mobile communication terminal connected to a Bluetooth headset according to a Bluetooth communication scheme, the method comprising:
(a) connecting to the headset through a simplexer and transmitting music data when the music data is played according to selection of a user;
(b) determining if a call has been connected while transmitting the music data;
(c) terminating the current connection to the headset through the simplexer and connecting to the headset through a duplexer while maintaining an unchanged playback of the music data when the call has been connected;
(d) decoding the music data and mixing the music data with data obtained by decoding incoming voice data received from a communication partner so as to obtain mixed data;
(e) outputting the mixed data to the headset without interruption of music data streaming through a transmission channel of the duplexer;
(f) mixing the music data and originating voice data received through a reception channel of the duplexer so that the communication partner receives the music data as background music during user-to-partner communication; and
(g) modulating mixture data resulting from mixing of the originating voice data and the music data, to output the mixture data to the communication partner.

13. The method as claimed in claim 12, further including terminating the connection through the duplexer when the call connection is terminated, reconnecting to the headset through the simplexer, and transmitting music data to the headset through the simplexer.

14. The method as claimed in claim 12, wherein step (d) further includes:
checking the background music volume information set by the user;
adjusting the amplification gain of the music data based on the background music volume information; and
mixing the music data, the amplification gain of the music data having been adjusted, with the data obtained by decoding the incoming voice data.

15. The method as claimed in claim 12, wherein the music data is decoded into PCM level data and the incoming voice data is decoded into PCM level data.

16. The method as claimed in claim 12, wherein the simplexer is an Asynchronous Connectionless Link (ACL) channel based on an audio video profile selected from Bluetooth profiles according to the Bluetooth communication scheme, and the duplexer is a Synchronous Connection-Oriented (SCO) link channel based on an audio gate profile selected from Bluetooth profiles according to the Bluetooth communication scheme.

17. The method as claimed in claim 12, wherein the simplexer is used to transmit data from the mobile communication terminal to the headset and the duplexer is used to exchange data between the mobile communication terminal and the headset.

18. The method as claimed in claim 12, wherein a bandwidth of the simplexer is greater than a bandwidth of the duplexer.

* * * * *